United States Patent
Araki et al.

(10) Patent No.: US 6,567,247 B1
(45) Date of Patent: May 20, 2003

(54) MAGNETORESISTANCE EFFECT TYPE HEAD

(75) Inventors: Satoru Araki, Tokyo (JP); Yoshihiro Tsuchiya, Tokyo (JP); Masashi Sano, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/515,327

(22) Filed: Feb. 29, 2000

(30) Foreign Application Priority Data

May 20, 1999 (JP) .......................................... 11-139798

(51) Int. Cl.$^7$ ............................................... G11B 5/127
(52) U.S. Cl. ................................................. 360/324.12
(58) Field of Search ...................... 360/324.11, 324.12, 360/314, 324; 324/252, 207.21

(56) References Cited

U.S. PATENT DOCUMENTS

| | | | |
|---|---|---|---|
| 4,949,039 A | * | 8/1990 | Gruenberg ................... 360/324 |
| 5,287,238 A | * | 2/1994 | Baumgart et al. .......... 360/314 |
| 5,366,815 A | | 11/1994 | Araki et al. |
| 5,510,172 A | | 4/1996 | Araki et al. |
| 5,514,452 A | | 5/1996 | Araki et al. |
| 5,657,190 A | | 8/1997 | Araki et al. |
| 5,661,449 A | | 8/1997 | Araki et al. |
| 5,736,236 A | | 4/1998 | Araki et al. |
| 5,783,284 A | | 7/1998 | Shinjo et al. |
| 5,789,069 A | | 8/1998 | Araki et al. |
| 5,798,896 A | | 8/1998 | Araki et al. |
| 5,862,022 A | | 1/1999 | Noguchi et al. |
| 5,874,886 A | | 2/1999 | Araki et al. |
| 5,923,504 A | | 7/1999 | Araki et al. |
| 5,958,611 A | | 9/1999 | Ohta et al. |
| 5,968,676 A | | 10/1999 | Araki et al. |
| 6,004,654 A | | 12/1999 | Shinjo et al. |

* cited by examiner

*Primary Examiner*—Allen Cao
(74) *Attorney, Agent, or Firm*—Oblon, Spivak, McClelland, Maier & Neustadt, P.C.

(57) ABSTRACT

An improved output magnetoresistance effect type head having a spin valve type multilayered film which includes a non-magnetic metal layer, a ferromagnetic layer, a soft magnetic layer, and a pinning layer, where the soft magnetic bias assist layers formed on the soft magnetic layer changes its magnetization direction in an external magnetic field. Bias applying layers formed on these layers for applying a bias in a longitudinal direction of the soft magnetic layer are made of antiferromagnetic $Ru_xM_yMn_z$, where M is Rh, Pt, Pd, Au, Ag, Re, Ir and Cr, $1 \leq x \leq 30$, $1 \leq y \leq 30$, $69 \leq z \leq 90$ and $10 \leq x+y \leq 31$ and the unit of x, y, z is atomic %.

24 Claims, 7 Drawing Sheets

PRIOR ART

MAGNETORESISTANCE EFFECT TYPE HEAD

BACKGROUND OF THE INVENTION

1. Field of the Invention

The present invention relates to a magnetoresistance effect type head for reading the magnetic field intensity of a magnetic recording medium or the like as a signal and, in particular, to a magnetoresistance effect type head using a spin valve film structure as a substantial magnetic information reading means.

2. Description of the Related Art

Recently, there has been the development for increasing the sensitivity of magnetic sensors and increasing the density in magnetic recording and, following this, magnetoresistance effect type magnetic sensors (hereinafter referred to as MR sensors) and magnetoresistance effect type magnetic heads (hereinafter referred to as MR heads) using magnetoresistance change have been actively developed. Both MR sensors and MR heads are designed to read out external magnetic field signals on the basis of the variation in resistance of a reading sensor portion formed of magnetic material. The MR sensors have an advantage that a high sensitivity can be obtained and the MR heads have an advantage that a high output can be obtained upon reading out signals magnetically recorded in high density because the reproduced output does not depend on the relative speed of the sensors or heads to the recording medium.

However, conventional MR sensors which are formed of magnetic materials such as $Ni_{80}Fe_{20}$ (Permalloy), NiCo or the like have a small resistance change ratio $\Delta R/R$ which is about 1 to 3% at maximum, and thus these materials have insufficient sensitivity as the reading MR head materials for ultrahigh density recording of the order of several GBPSI (Giga Bits Per Square Inches) or more.

Attention has been recently paid to artificial lattices having the structure in which thin films of metal having a thickness of an atomic diameter order are periodically stacked, because their behavior is different from that of bulk metal. One of such artificial lattices is a magnetic multilayered film having ferromagnetic metal thin films and non-magnetic metal thin films alternately deposited on a substrate. Heretofore, magnetic multilayered films of an iron-chromium type, a cobalt-copper type and the like have been known. However, these artificial lattice magnetic multilayered films are not commercially applicable as they are because the external magnetic field at which a maximum resistance change occurs (operating magnetic field intensity), is as high as several tens of kilo-oersted.

Under these circumstances, a new structure which is called a spin valve has been proposed. In this structure, two NiFe layers are formed via a non-magnetic metal layer, and an FeMn layer, for example, is further formed as a pinning layer so as to be adjacent to one of the NiFe layers.

In this case, since the FeMn layer and the NiFe layer adjacent thereto are directly exchange-coupled to each other, the direction of the magnetic spin of this NiFe layer is fixed in the range of several tens to several hundreds Oe in magnetic field intensity. On the other hand, the direction of the magnetic spin of the other NiFe layer is freely changeable by an external magnetic field. As a result, there can be achieved a magnetoresistance change ratio (MR ratio) of 2 to 5% in a small magnetic field range which corresponds to the degree of coercive force of the NiFe layer.

In the spin valve, by realizing a difference in relative angles of spins between two magnetic layers, the large MR change which differs from the conventional anisotropy magnetoresistance (AMR) effect is accomplished. This is realized by pinning of the magnetic layer spin due to the direct exchange coupling force between one of the magnetic layers and the antiferromagnetic layer. This exchange coupling can be the to be the substance of the spin valve.

As shown in FIG. 7 being a schematic structural diagram, the conventional general spin valve type magnetoresistance effect type head includes a spin valve film (magnetoresistance effect film) composed of a soft magnetic layer 20, a non-magnetic metal layer 30, a ferromagnetic layer 40 and a pinning layer 50 which are stacked in turn on a substrate, and further includes electrode portions 100 provided at both ends of the laminate film via hard magnetic layers (hard magnets) 500.

The main function of the hard magnetic layers (hard magnets) 500 is as follows: Specifically, a rising portion of the MR curve is determined by the rotation of magnetization of the soft magnetic layer 20. For obtaining sharper rising of the MR curve, it is desirable that the soft magnetic layer 20 changes its magnetization direction relative to a signal magnetic field solely by the magnetization rotation. However, in practice, the magnetic domain is generated in the soft magnetic layer 20 so that the magnetic wall movement and the magnetization rotation occur concurrently relative to the signal magnetic field. As a result, the Barkhausen noise is generated to render the MR head characteristic unstable. In view of this, the design specification has been adopted wherein by providing the hard magnetic layers (hard magnets) 500, a bias magnetic field (so-called longitudinal bias magnetic field) is applied in a longitudinal direction (direction of arrow α) of the soft magnetic layer 20 so as to obtain the MR head characteristic with the reduced Barkhausen noise.

However, in the spin valve magnetic head of the type wherein the hard magnetic layers (hard magnets) 500 are provided as a means for applying the foregoing so-called longitudinal bias magnetic field, the following points have been pointed out for improvement: Specifically, because of the magnetostatic field, when a large external magnetic field is applied to the hard magnetic layers (hard magnets), the magnetization direction of the bias magnetic field is liable to be changed due to an influence of the external magnetic field, which has been one cause of an occurrence of noise. There has also been a problem that the produced magnetic field fluctuates due to dispersion of crystal grain sizes of the hard magnetic layers (hard magnets) so that the uniform bias magnetic field can not be applied.

Further, it is difficult for the hard magnetic layers (hard magnets) to efficiently apply the longitudinal bias magnetic field due to the shape thereof to be formed, so that an excessive bias magnetic field may be applied, meaning that further enhancing an output of the magnetic head can not be expected. Moreover, it may also be difficult to realize further narrowing of the track.

The present invention has been made under these circumstances and has an object to provide a magnetoresistance effect type head which can improve an output thereof with reduced noise.

SUMMARY OF THE INVENTION

For solving the foregoing problems, according to one aspect of the present invention, there is provided a magnetoresistance effect type head comprising a magnetoresistance effect film of a spin valve film structure, wherein the magnetoresistance effect film is a spin valve type multilayered film which comprises a non-magnetic metal layer, a ferromagnetic layer formed on one surface of the non-magnetic metal layer, a soft magnetic layer formed on the other surface of the non-magnetic metal layer, and a pinning layer which is formed on a surface of the ferromagnetic layer remote from a surface thereof abutting the non-magnetic metal layer so as to pin a direction of magnetization of the ferromagnetic layer, wherein the soft magnetic layer is set to freely change its magnetization direction in response to an external magnetic field being magnetic information, and soft magnetic bias assist layers are formed at both ends of the soft magnetic layer, respectively, wherein bias applying layers are formed on the soft magnetic bias assist layers in a junction manner, respectively, for applying a bias in a longitudinal direction of the soft magnetic layer, wherein each of the bias applying layers is made of $Ru_xM_yMn_z$ exhibiting antiferromagnetism, wherein M represents at least one selected from Rh, Pt, Pd, Au, Ag, Re, Ir and Cr, $1 \leq x \leq 30$, $1 \leq y \leq 30$, $69 \leq z \leq 90$ and $10 \leq x+y \leq 31$ (unit of x, y, z: atomic %), and wherein the soft magnetic layer is applied with a bias magnetic field in the longitudinal direction of the soft magnetic layer (substantially equal to a direction from one of the bias applying layers to the other bias applying layer) by means of an exchange coupling magnetic field of the soft magnetic bias assist layers and the bias applying layers.

According to another aspect of the present invention, there is provided a magnetoresistance effect type head comprising a magnetoresistance effect film of a spin valve film structure, wherein the magnetoresistance effect film is a spin valve type multilayered film which comprises a non-magnetic metal layer, a ferromagnetic layer formed on one surface of the non-magnetic metal layer, a soft magnetic layer formed on the other surface of the non-magnetic metal layer, and a pinning layer which is formed on a surface of the ferromagnetic layer remote from a surface thereof abutting the non-magnetic metal layer so as to pin a direction of magnetization of the ferromagnetic layer, wherein the soft magnetic layer is set to freely change its magnetization direction in response to an external magnetic field being magnetic information, and soft magnetic bias assist layers are formed at both ends of the soft magnetic layer, respectively, wherein bias applying layers are formed on the soft magnetic bias assist layers in a junction manner, respectively, for applying a bias in a longitudinal direction of the soft magnetic layer, wherein each of the bias applying layers is made of $Ru_xM_yMn_z$ exhibiting antiferromagnetism, wherein M represents at least one selected from Rh, Pt, Pd, Au, Ag, Re, Ir and Cr, $1 \leq x \leq 59$, $1 \leq y \leq 59$, $40 \leq z \leq 58$ and $42 \leq x+y \leq 60$ (unit of x, y, z: atomic %), and wherein the soft magnetic layer is applied with a bias magnetic field in the longitudinal direction of the soft magnetic layer (substantially equal to a direction from one of the bias applying layers to the other bias applying layer) by means of an exchange coupling magnetic field of the soft magnetic bias assist layers and the bias applying layers.

It is preferable that the pinning layer is made of PtMn or an alloy containing PtMn no less than 80 at %.

It is preferable that the pinning layer is made of $Pt_{x1}M'_{y1}Mn_{z1}$, wherein M' represents at least one selected from Ru, Rh, Pd, Au, Ag, Fe, Ir and Cr, $30 \leq x1 \leq 60$, $0 \leq y1 \leq 30$ and $40 \leq z1 \leq 60$ (unit of x1, y1, z1: atomic %).

It is preferable that assuming that a substantially operating thickness of the soft magnetic layer is set to d1, a saturation magnetization thereof is set to M1, a thickness of each of the soft magnetic bias assist layers is set to d2, and a saturation magnetization thereof is set to M2, a relation of $2d1 \cdot M1 < d2 \cdot M2 < 5d1 \cdot M1$ is satisfied.

It is preferable that assuming that the soft magnetic layer and the soft magnetic bias assist layers are made of substantially the same material, a substantially operating thickness of the soft magnetic layer is set to d1, and a thickness of each of the soft magnetic bias assist layers is set to d2, a relation of $2d1 < d2 < 5d1$ is satisfied.

It is preferable that the bias applying layers are formed with electrode portions in a junction manner, respectively.

It is preferable that the soft magnetic layer comprises, from the side of the non-magnetic metal layer, a first soft magnetic layer made of Co or an alloy containing Co no less than 80 weight % and a second soft magnetic layer made of $(Ni_xFe_{1-x})_yCo_{1-y}$, wherein $0.7 \leq x \leq 0.9$ and $0.5 \leq y \leq 1.0$ (unit of x, y: weight %), and that the non-magnetic metal layer is made of a material containing at least one selected from Au, Ag and Cu.

It is preferable that the bias applying layers are formed while applying an external magnetic field in the longitudinal direction of the soft magnetic layer.

It is preferable that the magnetoresistance effect film is formed such that the pinning layer, the ferromagnetic layer, the non-magnetic metal layer and the soft magnetic layer are stacked in turn from the side of a substrate.

It is preferable that materials of the bias applying layers and the pinning layer are selected so that a blocking temperature Tb1 of the bias applying layers becomes lower than a blocking temperature Tb2 of the pinning layer.

It is preferable that the blocking temperature Tb1 of the bias applying layers is set to $170° C. \leq Tb1 \leq 290° C.$, and the blocking temperature Tb2 of the pinning layer is set to $300° C. \leq Tb2 \leq 400° C.$ It is preferable that the blocking temperature Tb1 of the bias applying layers and the blocking temperature Tb2 of the pinning layer satisfy a relation of $1.3 \leq Tb2/Tb1 \leq 2.6$.

DETAILED DESCRIPTION OF THE INVENTION

Now, preferred embodiments of the present invention will be described in detail with reference to the accompanying drawings.

Figure 1:
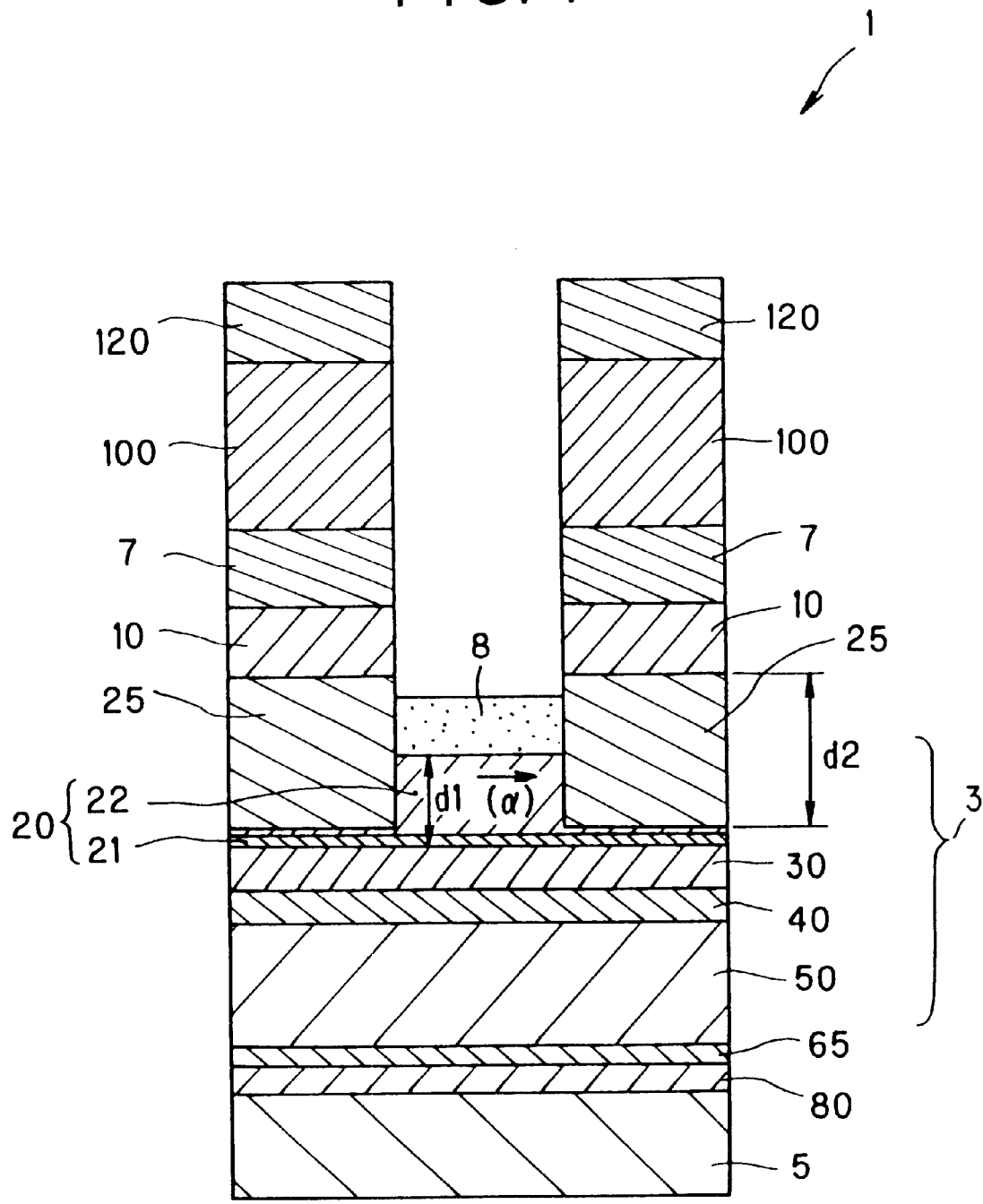
FIG. 1 is a schematic sectional view of a magnetoresistance effect type head according to a preferred embodiment of the present invention.

FIG. 1 is a sectional view showing the main part of a magnetoresistance effect type head 1 according to a preferred embodiment of the present invention. In this embodiment, the magnetoresistance effect type head 1 is provided with a magnetoresistance effect film 3 of a spin valve film structure as a substantial magnetic information reading means.

As shown in FIG. 1, the magnetoresistance effect film 3 has a laminate body structure which comprises a non-magnetic metal layer 30, a ferromagnetic layer 40 formed on one surface of the non-magnetic metal layer 30, a soft magnetic layer 20 formed on the other surface of the non-magnetic metal layer 30, and a pinning layer 50 which is formed on a surface of the ferromagnetic layer 40 remote from the other surface thereof abutting the non-magnetic metal layer 30 so as to pin the direction of magnetization of the ferromagnetic layer 40.

As shown in FIG. 1, the laminate body is normally formed on a substrate 5, and they are stacked from the side of the substrate 5, preferably via an under layer 80 and an orientation assist layer 65 made of so-called fcc metal of, for example, NiFe or Cu, in the order of the pinning layer 50, the ferromagnetic layer 40, the non-magnetic metal layer 30 and the soft magnetic layer 20.

In this embodiment, it is preferable that the soft magnetic layer 20 is in the form of a laminate body composed of two kinds of soft magnetic layers 21 and 22 as described later. The soft magnetic layer 20 can freely change its magnetization direction in response to an external magnetic field being magnetic information. At both ends of the soft magnetic layer 20, soft magnetic bias assist layers 25, 25 are formed, respectively. Further, bias applying layers 10, 10 are formed on the soft magnetic bias assist layers 25, 25 in a junction manner, respectively, for applying a bias in a longitudinal direction (direction of arrow α) of the soft magnetic layer 20. Further, electrode portions 100, 100 made of, for example, Cu are formed on the bias applying layers 10, 10 in a junction manner via protective layers 7, 7 made of, for example, Ta, respectively. On the electrode portions 100, 100, protective electrodes 120, 120 made of, for example, Ta are further formed, respectively. As shown in FIG. 1, a protective layer 8 is normally formed on the soft magnetic layer 20 for preventing oxidation.

In the magnetoresistance effect film 3 (spin valve film) according to this embodiment, it is required that the soft magnetic layer 20 and the ferromagnetic layer 40 which are adjacently formed at both sides of the non-magnetic metal layer 30 have substantially different magnetization directions from each other in accordance with a signal magnetic field applied from the external. The reason is as follows: In the principle of the present invention, when the magnetization directions of the soft magnetic layer 20 and the ferromagnetic layer 40 which are formed via the non-magnetic metal layer 30 interposed therebetween are deviated from each other, conduction electrons have a behavior of scattering due to spins to increase its resistance. In this case, when the magnetization directions are opposite to each other, the maximum resistance is obtained. That is, in this invention, when a signal magnetic field from the external is positive (in an upward direction with respect to a recording surface 93 of a recording medium 90 (represented by reference numeral 92)) as shown in FIG. 2, there occur mutually opposite components in the magnetization directions of the neighboring magnetic layers so that the resistance is increased.

Here, the relationship among the external signal magnetic field from the magnetic recording medium, the magnetization directions of the soft magnetic layer 20 and the ferromagnetic layer 40 and the variation of electrical resistance in the (spin valve) magnetic multilayered film 3 used in the magnetoresistance effect type head of the present invention will be described.

Now, in order to facilitate the understanding of the present invention, the simplest magnetic multilayered film in which the pair of soft magnetic layer 20 and ferromagnetic layer 40 exist via the non-magnetic metal layer 30 will be described with reference to FIG. 2.

Figure 2:
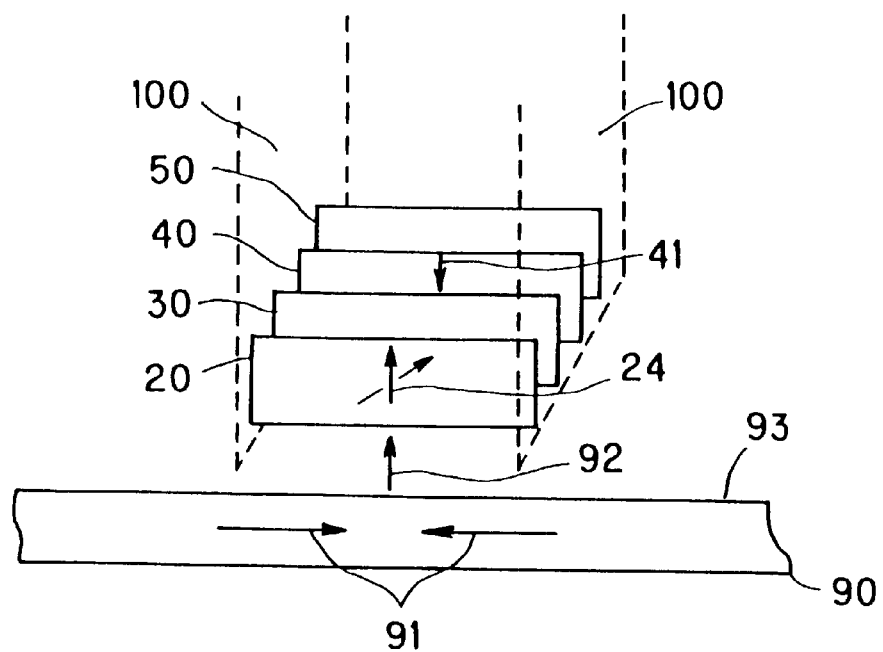
FIG. 2 is a schematic diagram showing a head element, particularly, a structure of a spin valve magnetic multilayered film, for explaining an operation of the present invention.

As shown in FIG. 2, the magnetization of the ferromagnetic layer 40 is pinned in a downward direction to the surface of the recording medium by a method as described later (see reference numeral 41). The soft magnetic layer 20 is formed via the non-magnetic metal layer 30 so that the magnetization direction thereof is varied in accordance with the signal magnetic field from the external (see reference numeral 24). At this time, the relative angle between the magnetization directions of the soft magnetic layer 20 and the ferromagnetic layer 40 is greatly varied in accordance with the direction of the signal magnetic field from the magnetic recording medium 90. As a result, the scattering degree of the conduction electrons flowing in the magnetic layers is varied, and thus the electrical resistance is greatly varied.

Accordingly, a large MR (Magneto-Resistance) effect, which essentially differs in mechanism from the anisotropic magnetoresistance effect of Permalloy, can be obtained.

Figure 3:
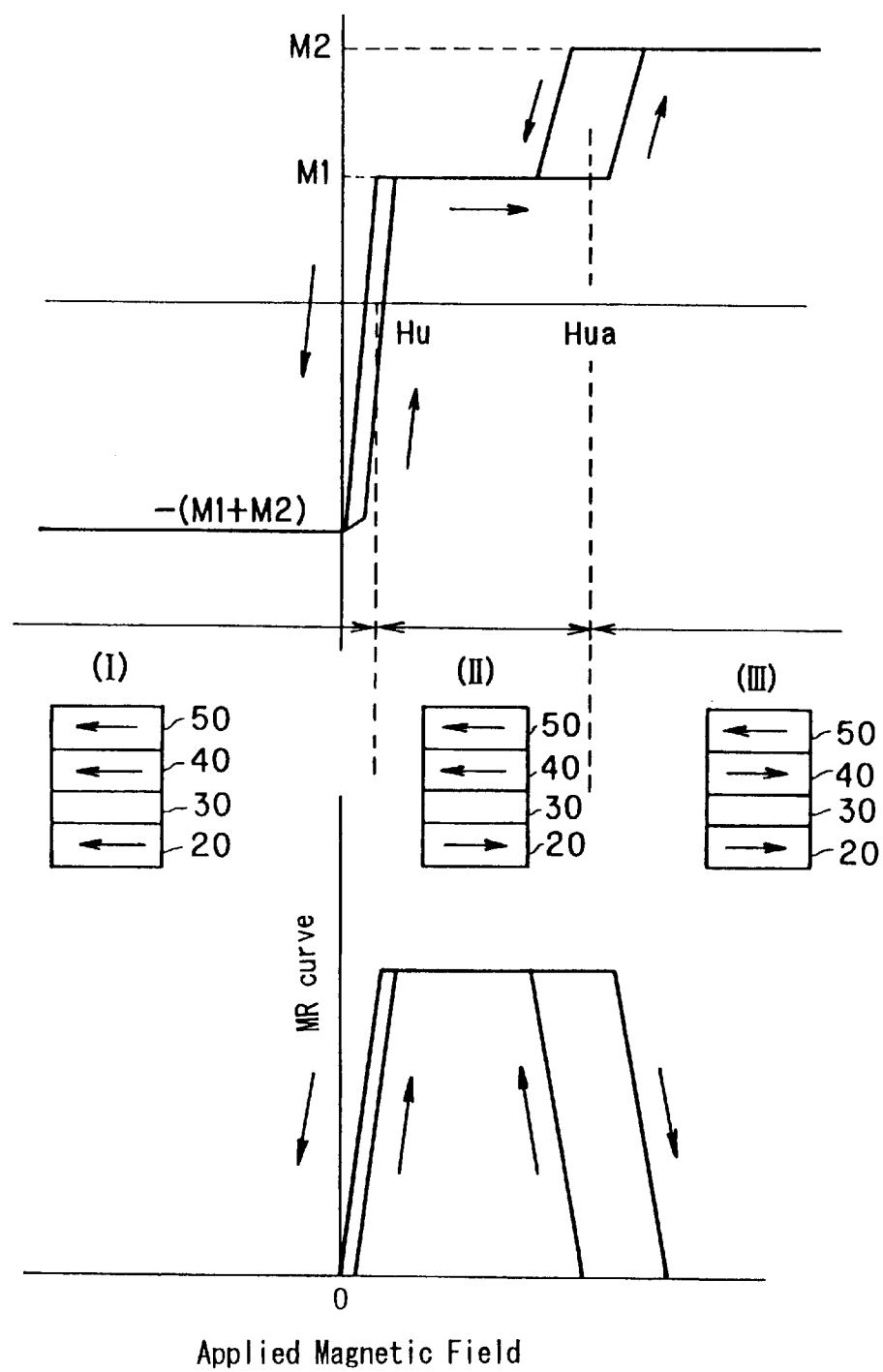
FIG. 3 is a schematic diagram showing a magnetization curve and an MR curve for explaining an operation of the present invention.

The magnetization directions of the soft magnetic layer 20, the ferromagnetic layer 40 and the pinning layer 50 exhibiting a pinning effect are varied relative to the external magnetic field. The variation of the magnetization directions thereof is shown in FIG. 3 in correspondence with the magnetization curve and the MR curve. In this case, all the magnetization of the ferromagnetic layer 40 is fixed in a minus direction (in a downward direction with respect to the recording surface of the recording medium 90). When the external signal magnetic field is minus, the magnetization of the soft magnetic layer 20 is in the minus direction. Now, it is assumed that the coercive force of each of the soft magnetic layer 20 and the ferromagnetic layer 40 is approximate to zero in order to simplify the description. In an area (I) where the signal magnetic field H<0, the magnetization of both the soft magnetic layer 20 and the ferromagnetic layer 40 is oriented in one direction.

When the external magnetic field is intensified and H exceeds the coercive force of the soft magnetic layer 20, the magnetization direction of the soft magnetic layer is rotated in the direction of the signal magnetic field, so that the magnetization and the electrical resistance are increased as the magnetization directions of the soft magnetic layer 20 and the ferromagnetic layer 40 become antiparallel to each other. Finally, these values are fixed (state of an area (II)). At this time, a pinning magnetic field Hua is applied by the pinning layer 50. If the signal magnetic field exceeds Hua, the magnetization of the ferromagnetic layer 40 is also rotated in the direction of the signal magnetic field, so that the magnetization of each of the soft magnetic layer 20 and the ferromagnetic layer 40 is oriented in the same direction in an area (III). At this time, the magnetization is set to a constant value, and the MR curve is equal to zero.

Conversely, when the signal magnetic field H is reduced, the magnetization is changed from the area (III) through the area (II) to the area (I) by inversion of the magnetization of the soft magnetic layer 20 and the ferromagnetic layer 40 in the same manner as described above. At an initial portion of the area (II), conduction electrons have a behavior of scattering dependent on spins, and the resistance is increased. In the area (II), the ferromagnetic layer 40 has little magnetization inversion because it is pinned, while the magnetization of the soft magnetic layer 20 increases linearly, so that the rate of spin-dependent scattered conduction electrons is gradually increased in accordance with the magnetization change of the soft magnetic layer 20. That is, if $Ni_{0.8}Fe_{0.2}$ whose Hc is low is selected for the soft magnetic layer 20 and a suitable anisotropic magnetic field Hk is applied, a formed magnetic multilayered film has a linearly-varying resistance and a large magnetoresistance ratio in a small external magnetic field of several Oe to several tens Oe below Hk.

The first main feature of the magnetic head 1 of the present invention having such a spin valve film structure resides in a structure to apply a so-called longitudinal bias magnetic field to the soft magnetic layer 20. Specifically, as shown in FIG. 1, the soft magnetic bias assist layers 25, 25 are formed at both ends of the soft magnetic layer 20 in a junction manner, and further the bias applying layers 10, 10 are stacked on the soft magnetic bias assist layers 25, 25 in a junction manner for applying a bias magnetic field in a longitudinal direction (direction of arrow α) of the soft magnetic layer.

With this arrangement, the soft magnetic layer 20 is applied with a bias magnetic field in the longitudinal direction thereof (direction of arrow α, i.e. direction substantially equal to a direction from one of the bias applying layers 10, 10 to the other bias applying layer 10) by means of an exchange coupling magnetic field of the soft magnetic bias assist layers 25, 25 and the bias applying layers 10, 10.

Each of the bias applying layers 10, 10 in the present invention is made of $Ru_xM_yMn_z$ exhibiting antiferromagnetism, wherein M represents at least one selected from Rh, Pt, Pd, Au, Ag, Re, Ir and Cr. As described above, M represents at least one element selected from Rh, Pt, Pd, Au, Ag, Re, Ir and Cr so that when M represents one element, the bias applying layer 10 has a three-element composition and, when M represents two or more elements, the bias applying layer 10 has a four or more element composition.

The effect of the present invention can be achieved in the foregoing all range of M, but a three-element composition including Rh or Pt is most preferable.

In $Ru_xM_yMn_z$, x, y and z each represent the composition rate of a corresponding element, wherein the unit is atomic %. With respect to $Ru_xM_yMn_z$ in the present invention, there exist the following two preferable composition ranges when roughly classified.

(1) Range defined by $1 \leq x \leq 30$, $1 \leq y \leq 30$, $69 \leq z \leq 90$ and $10 \leq x+y \leq 31$;
(2) Range defined by $1 \leq x \leq 59$, $1 \leq y \leq 59$, $40 \leq z \leq 58$ and $42 \leq x+y \leq 60$.

With respect to the range (1) defined by $1 \leq x \leq 30$, $1 \leq y \leq 30$, $69 \leq z \leq 90$ and $10 \leq x+y \leq 31$, a range defined by $1 \leq x \leq 24$, $1 \leq y \leq 24$, $75 \leq z \leq 85$ and $15 \leq x+y \leq 25$ is preferable, and a range defined by $1 \leq x \leq 22$, $1 \leq y \leq 22$, $77 \leq z \leq 82$ and $18 \leq x+y \leq 23$ is more preferable. In such a composition range, when a value of z becomes less than 69 atomic % so that a value of x+y exceeds 31 atomic %, there is raised a problem that a value of the exchange coupling magnetic field and a blocking temperature Tb1 (defined as a temperature where a value of the exchange coupling magnetic field becomes zero) are both reduced. On the other hand, when a value of z exceeds 90 atomic % so that a value of x+y becomes less than 10 atomic %, there is raised a problem that a value of the exchange coupling magnetic field and a blocking temperature Tb1 are both reduced similarly to the above, and a further problem that the corrosion resistance is lowered following an increment of Mn. In this composition range, it is considered that an irregular alloy of M and Mn is formed so that the whole bias applying layer 10 exhibits the antiferromagnetism to realize the excellent exchange coupling magnetic field. Further, by adjusting the composition in the range of $10 \leq x+y \leq 31$, the blocking temperature Tb1 can be desirably set in the range of, for example, 160° C. to 250° C.

With respect to the range (2) defined by $1 \leq x \leq 59$, $1 \leq y \leq 59$, $40 \leq z \leq 58$ and $42 \leq x+y \leq 60$, a range defined by $1 \leq x \leq 57$, $1 \leq y \leq 57$, $42 \leq z \leq 57$ and $43 \leq x+y \leq 58$ is preferable, a range defined by $1 \leq x \leq 54$, $1 \leq y \leq 54$, $45 \leq z \leq 55$ and $45 \leq x+y \leq 55$ is more preferable, and a range defined by $1 \leq x \leq 54$, $1 \leq y \leq 54$, $45 \leq z \leq 54$ and $46 \leq x+y \leq 55$ is further preferable. In such a composition range, the bias applying layer 10 exhibits a highly excellent exchange coupling magnetic field, blocking temperature Tb1 and corrosion resistance. In such a composition range, when a value of z becomes less than 40 atomic % so that a value of x+y exceeds 60 atomic %, there is raised a problem that a value of the exchange coupling magnetic field is rapidly reduced. On the other hand, when a value of z exceeds 58 atomic % so that a value of x+y becomes less than 42 atomic %, there is raised a problem that a value of the exchange coupling magnetic field is rapidly reduced similarly to the above. In the range (2) defined by $1 \leq x \leq 59$, $1 \leq y \leq 59$, $40 \leq z \leq 58$ and $42 \leq x+y \leq 60$, it is considered that Mn and the other elements form a regular alloy of approximately 1:1 so that the bias applying layer 10 exhibits a highly excellent exchange coupling magnetic field and blocking temperature Tb1. Further, since the amount of Mn is small, the corrosion resistance is also highly excellent. By adjusting the composition in the range of $42 \leq x+y \leq 60$, the blocking temperature Tb1 can be desirably set in the range of, for example, 160° C. to 400° C.

The blocking temperature Tb1 of the foregoing bias applying layer 10 is no less than 160° C., particularly 160° C. to 400° C., thereby exhibiting a very high thermal stability.

The exchange coupling energy of the bias applying layer 10 and the soft magnetic bias assist layer 25 used in the present invention is about 0.1 erg/cm² to 0.5 erg/cm².

In the present invention, the pinning layer 50 for pinning the magnetization direction of the ferromagnetic layer 40 having an important relation to the soft magnetic layer 20 is preferably made of PtMn or an alloy containing PtMn no less than 80 at %. As a preferable PtMn material, a material represented by $Pt_{x1}M'_{y1}Mn_{z1}$ can be cited other than PtMn, wherein M' represents at least one element selected from Ru, Rh, Pd, Au, Ag, Fe, Ir and Cr, and Ru and Rh are most preferable among them, and wherein a range of x1 is set to $30 \leq x1 \leq 60$, a range of y1 is set to $0 \leq y1 \leq 30$ and a range of z1 is set to $40 \leq z1 \leq 60$. The unit of x1, y1 and z1 is atomic %.

In the present invention, a combination of two kinds of antiferromagnetic materials functioning to fix the magnetization direction, i.e. a combination of the antiferromagnetic material ($Ru_xM_yMn_z$) forming the bias magnetic layer 10 and the antiferromagnetic material (PtMn) forming the pinning layer 50, is particularly important. With the combination of those given materials, extremely high effects much beyond expectation of skilled persons can be accomplished, such as notable improvement in head output and notable reduction in noise level.

The thickness of the pinning layer 50 is set to 50 Å to 1000 Å, preferably 60 Å to 800 Å, more preferably 70 Å to 500 Å, and further preferably 70 Å to 300 Å.

The ferromagnetic layer 40 is formed of a metal element such as Fe, Ni, Co, Mn, Cr, Dy, Er, Nd, Tb, Tm, Ce, Gd, alloy or compound containing the above metal element. Particularly, it is preferably formed of a composition expressed by $(Co_zNi_{1-z})_wFe_{1-w}$ ($0.4 \leq z \leq 1.0$, $0.5 \leq w \leq 1.0$ by weight). The thickness of the ferromagnetic layer 40 as described above is set to 16 Å to 100 Å, and more preferably 16 Å to 60 Å.

As described above, since the ferromagnetic layer 40 is in direct abutment with the pinning layer 50, a direct interlayer interaction acts on each other, and the rotation of the magnetization of the ferromagnetic layer 40 is prevented. On the other hand, with respect to the soft magnetic layer 20, its magnetization can be freely rotated by a signal magnetic field from outside. As a result, a relative angle is produced in magnetization between the soft magnetic layer 20 and the ferromagnetic layer 40, so that a large MR effect due to the difference between the magnetization directions can be obtained.

The soft magnetic layer 20 is formed of Fe, Ni, Co or the like revealing soft magnetic characteristics, or alloy or compound containing these elements. The MR curve rises up more sharply by using the magnetic layer having a small coercive force Hc, and a favorable effect can be obtained. It is particularly preferable that the soft magnetic layer 20 has the following two-layer structure. Specifically, the soft magnetic layer 20 is formed as a two-layer laminate body comprising, from the side of the non-magnetic metal layer 30, a first soft magnetic layer 21 (FIG. 1) and a second soft magnetic layer 22 (FIG. 1). The first soft magnetic layer 21 is made of a simple substance of Co (cobalt) or an alloy containing Co no less than 80 weight %. The second soft magnetic layer 22 has a composition expressed by $(Ni_xFe_{1-x})_yCo_{1-y}$ ($0.7 \leq x \leq 0.9$, $0.5 \leq y \leq 1.0$ by weight).

With this arrangement, the first soft magnetic layer 21 with Co being rich works as a diffusion blocking layer so as to prevent diffusion of Ni from the side of the second soft magnetic layer 22 toward the non-magnetic metal layer 30. Further, since the first soft magnetic layer 21 with Co being rich enhances the scattering of electrons, the MR change ratio is improved. The second soft magnetic layer 22 is formed within the foregoing composition range for maintaining the soft magnetic characteristic.

The thickness of the soft magnetic layer 20 as described above is set to 20 Å to 150 Å, preferably 30 Å to 120 Å, and more preferably 30 Å to 100 Å. When the soft magnetic layer 20 is in the form of the foregoing two-layer laminate body, it is sufficient to set the thickness of the Co-rich first soft magnetic layer to be no less than 4 Å.

In the present invention, as shown in FIG. 1, assuming that the thickness of the soft magnetic layer 20 substantially operating is set to d1, the saturation magnetization thereof is set to M1, the thickness of each of the soft magnetic bias assist layers 25, 25 connected to the soft magnetic layer 20 is set to d2, and the saturation magnetization thereof is set to M2, a relation of $2d1 \cdot M1 < d2 \cdot M2 < 5d1 \cdot M1$ is satisfied. If $d2 \cdot M2$ becomes no greater than $2d1 \cdot M1$ or exceeds $5d1 \cdot M1$, there is raised a problem that the so-called longitudinal bias magnetic field can not be applied in a good condition thereby to reduce the head output and increase the noise.

If the soft magnetic layer 20 and the soft magnetic bias assist layers 25, 25 are made of the same material, since the saturation magnetization of each layer is equal to each other, it is sufficient to satisfy a relation of $2d1 < d2 < 5d1$.

In order to conduct electrons efficiently, a metal having conductivity is preferably used for the non-magnetic metal layer 30 which is interposed between the soft magnetic layer 20 and the ferromagnetic layer 40. More specifically, it may be formed of at least one selected from Au, Ag and Cu, alloy containing 60 weight % or more of at least one of these elements, or the like.

The thickness of the non-magnetic metal layer 30 is preferably set to 15 Å to 40 Å.

The protection layer 8 is provided for mainly preventing oxidation of the surface of the magnetic multilayered film in a film forming process. The protection layer 8 is made of Ti, Ta, W, Cr, Hf, Zr, Zn or the like. The thickness thereof is generally set to about 20 Å to 300 Å.

The substrate 5 is made of glass, silicon, MgO, GaAs, ferrite, AlTiC, $CaTiO_3$ or the like, and the thickness thereof is generally set to about 0.5 to 10 mm.

The formation of each layer of the foregoing spin valve multilayered film is carried out by an ion beam sputter method, a sputtering method, a vapor deposition method, a molecular beam epitaxy (MBE) method or the like.

In the embodiment shown in FIG. 1, the respective films are basically formed in turn from a lower layer to an upper layer in FIG. 1. It is preferable that, as shown in FIG. 1, the magnetoresistance effect film is formed such that the pinning layer, the ferromagnetic layer, the non-magnetic metal layer and the soft magnetic layer are stacked in turn in the order named from the side of the substrate. This is because the bias applying layers 10 can produce the sufficient longitudinal bias magnetic field relative to the soft magnetic layer 20 when they are formed after forming the soft magnetic bias assist layers 25.

Upon forming the soft magnetic layer 20 and the soft magnetic bias assist layers 25, it is preferable to apply an external magnetic field of 10 Oe to 300 Oe in the longitudinal direction (α direction) within the film plane. With this arrangement, an anisotropic magnetic field Hk can be applied to the soft magnetic layer 20 and the soft magnetic bias assist layers 25. The external magnetic field may be applied using an apparatus including, for example, an electromagnet.

Similarly, upon forming the bias applying layers 10 on the soft magnetic bias assist layers 25, it is preferable to apply an external magnetic field of 10 Oe to 300 Oe in the longitudinal direction (α direction) within the film plane. With this arrangement, the magnetization direction of the soft magnetic bias assist layers 25 is securely fixed in the applied magnetic field direction by means of the bias applying layers 10 so that the so-called longitudinal bias can be effectively applied to the soft magnetic layer 20.

When forming the pinning layer 50 which is exchange-coupled to the ferromagnetic layer 40 to pin the magnetization direction of the ferromagnetic layer 40, the magnetic field is preferably applied in a direction perpendicular to the direction of the magnetic field applied at the film formation time of the soft magnetic film 20. Specifically, it is applied within the film plane of the magnetic multilayered film and in a direction orthogonal to the measurement current. The magnitude of the applied magnetic field is preferably set in the range of 10 to 300 Oe. With this operation, the magnetization direction of the ferromagnetic layer 40 is surely fixed in the applied magnetic field direction (direction perpendicular to the measurement current) by the pinning layer 50, whereby the magnetization of the ferromagnetic layer can be most reasonably set to be antiparallel to the magnetization of the soft magnetic layer 20 whose direction can be freely changed by the signal magnetic field. However, this is not a necessary condition. When a heat treatment at about 200° C. to 300° C. is carried out in the process after the magnetic multilayered film is formed, a pinning process (orthogonalization heat treatment) is finally performed such that the temperature is decreased while applying the magnetic field in a strip short-side direction (direction perpendicular to the direction of the applied magnetic field when the soft magnetic layer 20 is formed), so as to surely fix the magnetization direction of the ferromagnetic layer 40 in the applied magnetic field direction (direction perpendicular to the measurement current) by means of the pinning layer 50. Specifically, for achieving the orthogonalization of magnetization, the magnetic multilayered film is subjected to a vacuum heat treatment at no less than a blocking temperature Tb2 of the pinning layer 50 in the magnetic field. It is preferable to carry out the orthogonalization heat treatment at the final stage of the head fabricating process. In the orthogonalization heat treatment, it is preferable to change only the magnetization direction of the pinning layer 50. Preferably, the orthogonalization temperature is higher than the blocking temperature Tb2 of the pinning layer 50, lower than a temperature at which the induced magnetic anisotropy of the soft magnetic layer 20 is lost, and higher than the blocking temperature Tb1 of the bias applying layer 10. If the orthogonalization heat treatment is carried out when the blocking temperature Tb2 is higher than the temperature at which the induced magnetic anisotropy of the soft magnetic layer 20 is lost, the magnetization direction of the soft magnetic layer 20 is oriented in a magnetization easy axis direction relative to the external magnetic field so that the magnetoresistance effect curve relative to the external magnetic field is subjected to hysteresis to cause a problem in linearity. On the other hand, when the blocking temperature Tb2 is too lower than the temperature at which the induced magnetic anisotropy of the soft magnetic layer 20 is lost, the exchange coupling magnetic field Hua is deteriorated due to heat applied during operation of an MR sensor in the magnetic recording system and during the spin valve head fabricating process so that the magnetic multilayered film can not work as a spin valve film. That is, it is preferable to form the pinning layer 50 having the blocking temperature Tb2 which is a little lower than the temperature at which the induced magnetic anisotropy of the soft magnetic layer 20 is lost, and carry out the orthogonalization heat treatment.

Further, at a temperature T3 which is lower than the blocking temperature Tb2 of the pinning layer 50 and higher than the blocking temperature Tb1 of the bias applying layer, the applying direction of the external magnetic field is rotated by 90 degrees so as to cause the external magnetic field applying direction and the longitudinal bias direction to coincide with each other. By lowering the temperature while applying the magnetic field in this condition, the orthogonalization of the pinning layer 50 and the longitudinal bias direction can be ensured. Thus, it is essential that the blocking temperature Tb1 of the bias applying layer 10 is lower than the blocking temperature Tb2 of the pinning layer 50. It is preferable that $300° C. \leq Tb2 \leq 400° C.$ and $170° C. \leq Tb1 \leq 290° C.$, and a particularly preferable temperature ratio is $1.3 \leq Tb2/Tb1 \leq 2.6$.

In the magnetoresistance effect type head 1 shown in FIG. 1, although not shown in FIG. 1, a pair of upper and lower shield layers are formed at upper and lower end portions in the drawing so as to sandwich the laminate body of FIG. 1, and a non-magnetic insulation layer is formed at a portion between the magnetoresistance effect element and the shield layers.

In FIG. 1, the soft magnetic bias assist layers 25 are formed on portions where the whole of both end portions of the soft magnetic layer 20 is substantially etched (in practice, some part may slightly remain as shown in FIG. 1). Accordingly, the thickness of the soft magnetic layer 20 after removal by etching (thickness of the soft magnetic layer 20 under the soft magnetic bias assist layer 25) can be ignored, so that the thickness of the soft magnetic bias assist layer 25 is denoted by d2 as shown.

Figure 4:
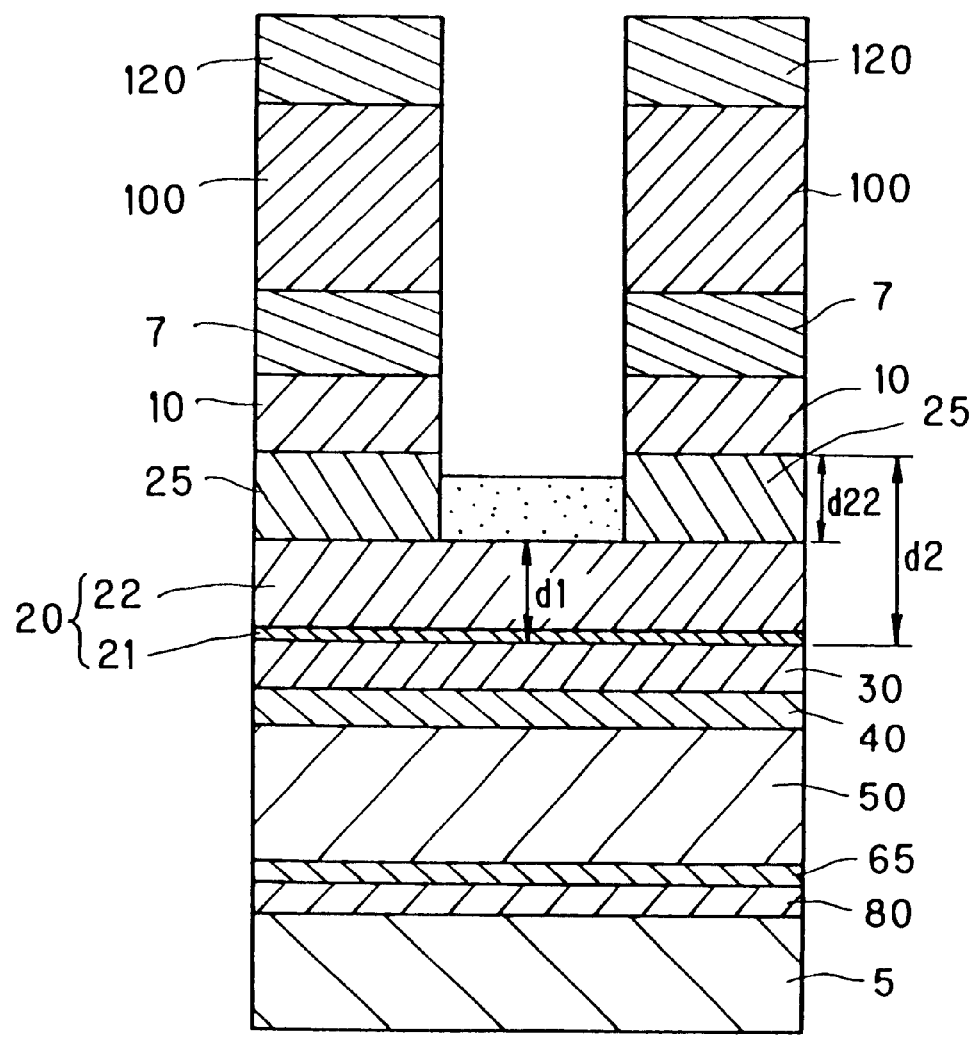
FIG. 4 is a schematic sectional view of a magnetoresistance effect type head according to another preferred embodiment of the present invention.

FIG. 4 shows another preferred embodiment of the present invention, wherein both end portions of the soft magnetic layer 20 are not etched so that the soft magnetic bias assist layers 25 are formed thereon. In this case, it is necessary that the thickness d2 of the soft magnetic bias assist layer 25 in the present invention be considered to be the sum of a thickness d22 of the soft magnetic bias assist layer 25 itself and the thickness d1 of the soft magnetic layer 20, i.e. $d2=d22+d1$, that the saturation magnetization M2 be the arithmetic mean of the saturation magnetization of the soft magnetic layer 20 and that of the soft magnetic bias assist layer 25, being proportional to the thicknesses of the layers 20 and 25, and that the foregoing inequality relational expression be satisfied using this arithmetic mean as M2.

Figure 5:
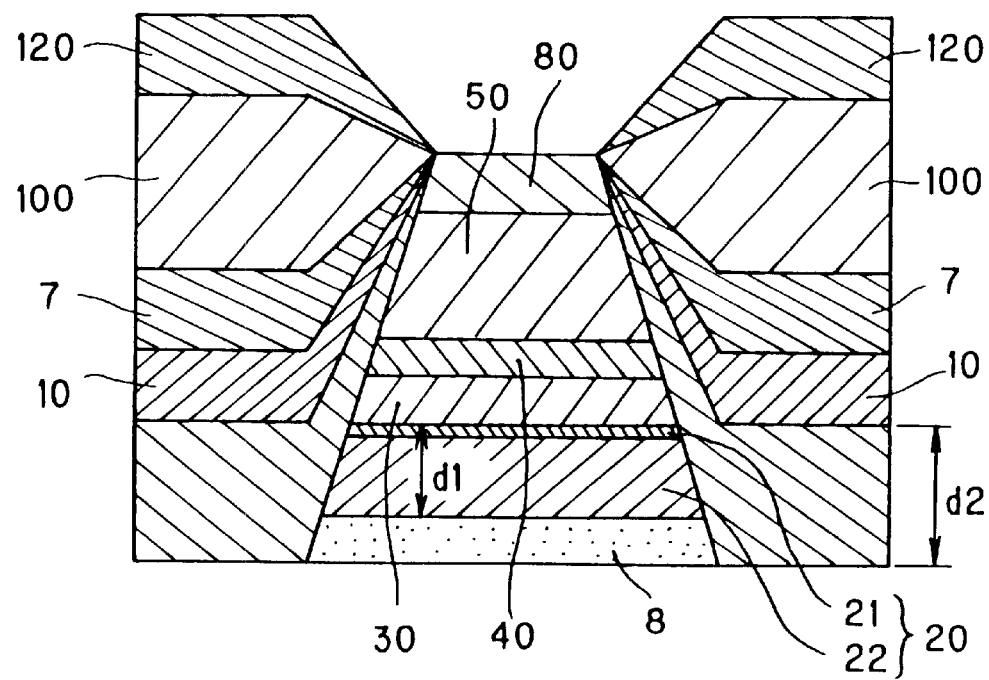
FIG. 5 is a schematic sectional view of a magnetoresistance effect type head according to another preferred embodiment of the present invention.

FIGS. 1 and 2 show the so-called pinning layer bottom type spin valve film wherein the pinning layer 50 is located at the side of the substrate in the laminate structure. On the other hand, FIG. 5 shows a so-called pinning layer top type spin valve film wherein the laminate order is basically reversed. In FIG. 5, the same reference signs as those in FIG. 1 represent the same components.

The invention of the foregoing magnetoresistance effect type head will be explained in further detail based on the following concrete examples.

EXAMPLE I

A magnetoresistance effect type head sample was prepared which is substantially the same as the spin valve type magnetoresistance effect type head shown in FIG. 1.

Specifically, an under layer 80 (Ta; 20 Å in thickness), an NiFe layer 65 (30 Å in thickness) for promoting crystallization, a pinning layer 50 (PtMn antiferromagnetic layer; 200 Å in thickness), a ferromagnetic layer 40 (Co; 20 Å in thickness), a non-magnetic metal layer 30 (Cu; 24 Å in thickness), and a soft magnetic layer 20 (first soft magnetic layer 21 (9 Å in thickness) made of Co and second soft magnetic layer (51 Å in thickness) made of NiFe: total thickness d1=60 Å) were formed on a substrate 5 (AlTiC with $Al_2O_3$), then both end portions of the second soft magnetic layer made of NiFe of the soft magnetic layer 20 were etched for removal as shown in FIG. 1, then soft magnetic bias assist layers 25, 25 (NiFe; thickness d2=160 Å) were formed on the etched portions, then bias applying layers 10, 10 (composition: as shown in Table 1; 120 Å in thickness) were formed on the soft magnetic bias assist layers 25, 25, and then protective layers 7, 7 made of Ta (100 Å in thickness), electrode portions 100, 100 made of Cu (800 Å in thickness) and protective electrodes 120, 120 made of Ta (100 Å in thickness) were formed in turn on the bias applying layers 10, 10. Further, a protective layer 8 made of Ta was formed on the soft magnetic layer 20 for preventing oxidation.

Various magnetic head samples were prepared by changing the composition of the bias applying layers 10, 10 as shown in Table 1.

As a comparative sample (sample No. I-16 (comparison)), a conventional magnetic head was prepared which did not use the antiferromagnetic bias applying layers of the present invention, but used the conventional hard magnets for applying a longitudinal bias to the soft magnetic layer.

With respect to each of the samples, values of the following evaluation items (1) to (3) were measured to evaluate the samples.

(1) Standardization Head Output ($\mu V/\mu m$)

Using a head having a track width of 0.7 $\mu$m and an MR height (length in a direction perpendicular to a track width direction of an MR element portion) of 0.5 $\mu$m, an output thereof was measured by N=50 and the standardization head output ($\mu V/\mu m$) was evaluated based on the measured head output ($\mu V$).

(2) Waveform Asymmetry (%)

The waveform asymmetry represents the waveform asymmetry of the head reproducing waveform. Smaller % represents a smaller degree of the waveform asymmetry, meaning a better condition.

(3) Output Variation (COV: Covarient) (Noise) (%)

This value represents a variation of head outputs. Specifically, this value represents a value obtained by dividing a standard deviation $\sigma$ of dispersion in head output values measured by repeating recording and reproduction 100 times, by the mean value of the head output values. It is necessary that this value be 2% or smaller. The results are shown in Table 1.

TABLE 1

| Sample No. | Bias applying layer | Standardization head output ($\mu V/\mu m$) | Asym. (%) | COV (%) |
|---|---|---|---|---|
| I-1 | Ru5Rh18Mn77 | 2560 | −6.2 | 1.3 |
| I-2 | Ru3Rh15Mn82 | 2650 | −6.0 | 1.2 |
| I-3 | Ru1Rh20Mn79 | 2610 | −6.8 | 1.2 |
| I-4 | Ru10Rh36Mn54 | 2540 | −7.8 | 1.5 |
| I-5 | Ru17Pt5Mn78 | 2420 | −8.2 | 1.6 |
| I-6 | Ru2Ir20Mn78 | 2640 | −7.2 | 1.2 |
| I-7 | Ru8Pt40Mn52 | 2360 | −8.1 | 1.2 |
| I-8 | Ru10Pd10Mn80 | 2490 | −7.6 | 1.5 |
| I-9 | Ru15Au5Mn80 | 2430 | −7.9 | 1.6 |
| I-10 | Ru20Ag5Mn75 | 2550 | −7.1 | 1.7 |
| I-11 | Ru12Re7Mn81 | 2410 | −7.5 | 1.4 |
| I-12 (COMP) | Rh5Mn95 | 1820 | −8.5 | 4.8 |
| I-13 (COMP) | Fe50Mn50 | 1750 | −8.1 | 2.6 |
| I-14 (COMP) | Ru20Rh42Mn38 | 1680 | −8.4 | 4.4 |
| I-15 (COMP) | Ru15Pt25Mn60 | 1740 | −8.6 | 4.9 |
| I-16 (COMP) | — | 1410 | −8.8 | 2.5 |

I-16 (COMP) sample is of a type which uses conventional hard magnets as a longitudinal bias applying means.

From the results shown in Table 1, it is seen that the large standardization outputs exceeding 2000 $\mu V/\mu m$ can be obtained in the inventive samples. Further, in the inventive samples, values of COV are 1.7% or smaller so that stable waveforms with less noise can be obtained.

On the other hand, in the comparative samples, the large standardization outputs exceeding 2000 $\mu V/\mu m$ can not be obtained. Further, since the sufficient longitudinal bias is not applied, values of COV are 2.5% or greater meaning bad data.

It is preferable that the standardization output be 2000 $\mu V/\mu m$ or higher, particularly 2300 $\mu V/\mu m$ or higher. The value of COV should be 2% or smaller.

EXAMPLE II

An experiment was conducted for examining an effect of a combination between two kinds of antiferromagnetic materials which function to fix the magnetization direction, i.e. a combination between an antiferromagnetic material ($Ru_xM_yMn_z$) forming the bias applying layers 10 and an antiferromagnetic material (PtMn) forming the pinning layer 50.

Specifically, in the sample I-1 in the foregoing example I, the PtMn composition forming the pinning layer 50 was changed as shown in Table 2 while unchanging the others, so as to prepare the inventive samples (sample Nos. II-1, II-2) as shown in Table 2. For comparison, comparative samples (sample Nos. II-3 to II-6) each having a pinning layer 50 of other than the PtMn composition were prepared.

With respect to these samples, the evaluation items (1) to (3) were evaluated like in the foregoing example I. The results are shown in Table 2.

TABLE 2

| Sample No. | Pinning layer | Standardization head output ($\mu V/\mu m$) | Asym. (%) | COV (%) |
|---|---|---|---|---|
| I-1* | Pt49Mn51 | 2560 | −6.2 | 1.3 |
| II-1 | Pt43Ru5Mn52 | 2610 | −6.0 | 1.1 |
| II-2 | Pt38Rh11Mn51 | 2750 | −5.8 | 1.0 |
| II-3 (COMP) | NiMn | 1980 | −6.9 | 1.9 |
| II-4 (COMP) | FeMn | 1400 | −7.9 | 4.3 |
| II-5 (COMP) | NiO | 1710 | −8.4 | 3.8 |
| II-6 (COMP) | Ru24Mn76 | 1560 | −8.9 | 3.2 |

*Sample I-1 in Table 1

From the results shown in Table 2, it is seen that the inventive samples exhibit sufficient standardization outputs exceeding 2500 $\mu V/\mu m$ and values of COV smaller than 2%, and are thus provided with the excellent head characteristic.

On the other hand, the comparative samples exhibit standardization outputs and COV values both being bad due to a pinning effect being insufficient for producing a longitudinal bias, and are thus not suitable for a practical use.

EXAMPLE III

An experiment was conducted for confirming that a relation of $2d1 \cdot M1 < d2 \cdot M2 < 5d1 \cdot M1$ was necessary, wherein d1 represents a substantially operating thickness of the foregoing soft magnetic layer 20 as shown in FIG. 1, M1 represents the saturation magnetization thereof, d2 represents a thickness of the soft magnetic bias assist layer 25 connected to the soft magnetic layer 20, and M2 represents the saturation magnetization thereof.

Specifically, in the sample No. I-1 in the foregoing example I, the thickness d1 of the soft magnetic layer 20 and the thickness d2 and material of the soft magnetic bias assist layer 25 were changed as shown in Table 3 while unchanging the others, so as to prepare various samples as shown in Table 3.

With respect to these samples, the evaluation items (1) to (3) were evaluated like in the foregoing example I. The results are shown in Table 3.

TABLE 3

| Sample No. | Thickness d1 of soft magnetic layer (Å) | Soft magnetic bias assist layer Thickness d2 (Å) | Soft magnetic bias assist layer Material | Relation between d1 and d2 | Standardization head output (μV/μm) | Asym. (%) | COV (%) |
|---|---|---|---|---|---|---|---|
| I-1* | 60 | 160 | NiFe | ○ | 2560 | −6.2 | 1.3 |
| III-1 | 60 | 130 | NiFe | ○ | 2950 | −7.3 | 1.8 |
| III-2 | 60 | 250 | NiFe | ○ | 2800 | −7.0 | 1.6 |
| III-3 | 60 | 290 | NiFe | ○ | 2760 | −6.9 | 1.5 |
| III-4 | 70 | 150 | NiFe | ○ | 2860 | −6.7 | 1.8 |
| III-5 | 70 | 280 | NiFe | ○ | 2740 | −6.5 | 1.4 |
| III-6 | 70 | 340 | NiFe | ○ | 2610 | −6.8 | 1.2 |
| III-7 | 80 | 170 | NiFe | ○ | 2780 | −5.8 | 1.7 |
| III-8 | 80 | 240 | NiFe | ○ | 2660 | −6.0 | 1.3 |
| III-9 | 80 | 390 | NiFe | ○ | 2420 | −5.9 | 0.9 |
| III-10 | 60 | 200 | Co | ○ | 2740 | −7.6 | 1.4 |
| III-11 | 70 | 200 | Co | ○ | 2690 | −6.8 | 1.0 |
| III-12 | 80 | 200 | Co | ○ | 2580 | −5.4 | 0.8 |
| III-13 (COMP) | 60 | 100 | NiFe | X | 3150 | −8.8 | 4.3 |
| III-14 (COMP) | 60 | 360 | NiFe | X | 1940 | −8.4 | 1.3 |
| III-15 (COMP) | 80 | 150 | NiFe | X | 2860 | −5.9 | 3.9 |
| III-16 (COMP) | 80 | 450 | NiFe | X | 1710 | −6.2 | 1.3 |

"○" indication in "relation between d1 and d2": satisfying the range identified by the inequality of the present invention
"X" indication in "relation between d1 and d2": not satisfying the range identified by the inequality of the present invention From the results shown in Table 3, it is seen that the inventive samples satisfying the relational expression of d1 and d2 exhibit large standardization outputs exceeding 2000 μV/μm and values of COV smaller than 2.0%.

On the other hand, when the values deviate from the relational expression in a lower direction as in the comparative samples III-13 and III-15, although standardization outputs are large, COV values become much greater than 2.0%, which is inconvenient. When the values deviate from the relational expression in an upper direction as in the comparative samples III-14 and III-16, although COV values become less than 2.0%, standardization outputs become less than 2000 μV/μm so that the sufficient characteristic can not be obtained.

EXAMPLE IV

Using the inventive sample I-1 and the conventional comparative sample I-16 (of the type wherein the conventional hard magnets were used as the longitudinal bias applying means) prepared in the foregoing example I, an experiment was conducted for confirming the stability of longitudinal biases of both samples relative to an external magnetic field.

Figure 6A:
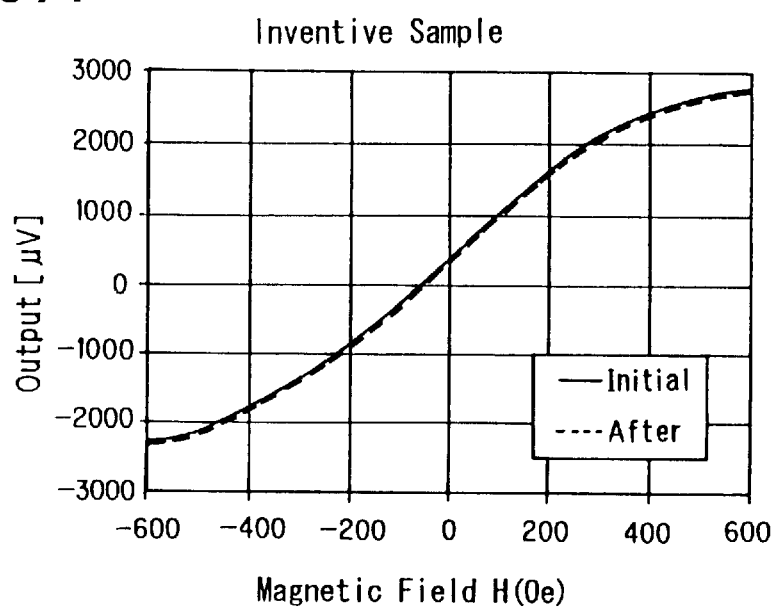
FIG. 6A is a graph showing a relationship, examined using an inventive sample, between a detected external magnetic field (−600 Oe to 600 Oe) and a head output before and after applying an external magnetic field being disturbance.
Figure 6B:
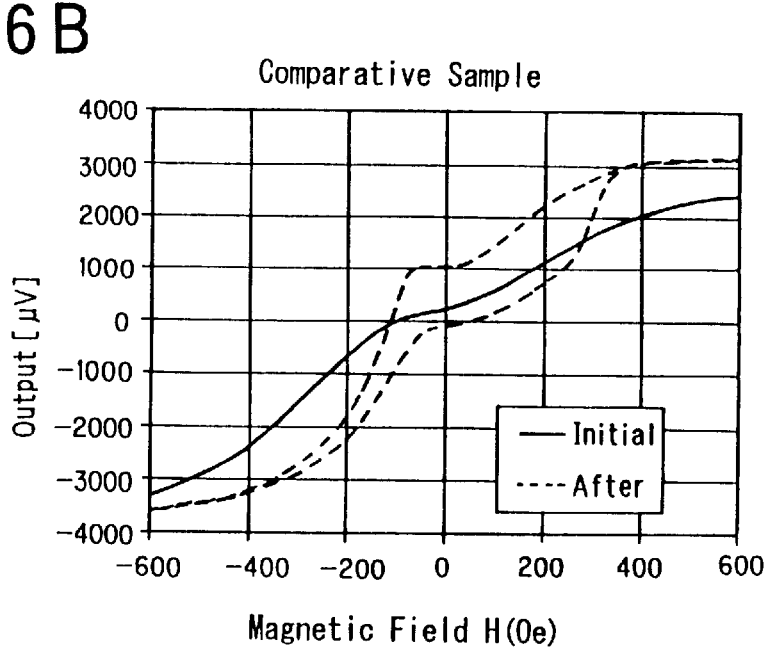
FIG. 6B is a graph showing a relationship, examined using a comparative sample, between a detected external magnetic field (−600 Oe to 600 Oe) and a head output before and after applying an external magnetic field being disturbance.
Figure 7:
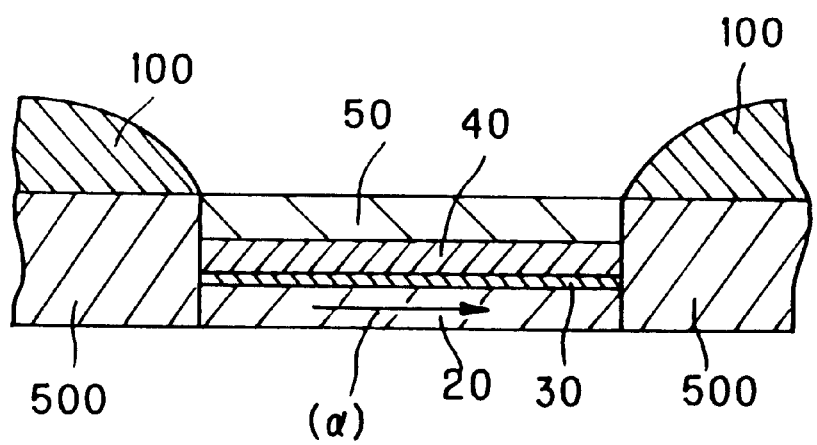
FIG. 7 is a schematic sectional view of a conventional magnetic head provided with a mechanism for applying a longitudinal bias using hard magnets.

Specifically, in a direction (direction identified by reference numeral 92 in FIG. 2) perpendicular to the longitudinal bias direction of both samples, an external magnetic field of 5 kOe was applied as disturbance. Using the samples before and after applying the disturbance external magnetic field, a relation between the detected external magnetic field (−600 Oe to 600 Oe) and the head output was examined. The results are shown in graphs of FIGS. 6A and 6B. FIG. 6A shows the graph when the inventive sample was used, while FIG. 6B shows the graph when the comparative sample was used. In the drawing, "Initial" given by the solid line represents the measurement in the state before the external magnetic field of 5 kOe was applied as disturbance, while "After" given by the dotted line represents the measurement in the state after the external magnetic field of 5 kOe was applied as disturbance.

As shown in the graph of FIG. 6A, it is seen that, in the inventive sample, even if the external magnetic field of 5 kOe was applied as disturbance, the same state can be maintained as compared with the state before the external magnetic field was applied. Specifically, it is seen that the stability of the longitudinal bias against the disturbance is highly excellent. In contrast, as shown in the graph of FIG. 6B, the longitudinal bias is largely influenced by the disturbance in the comparative sample. Thus, the comparative sample lacks stability in bias.

From the foregoing results, the effect of the present invention is clear. Specifically, in the present invention, the longitudinal bias magnetic field is applied to the soft magnetic layer by means of the exchange coupling magnetic field of the bias applying layers showing the given antiferromagnetism and the soft magnetic bias assist layers, so that the bias magnetic field is applied quite efficiently to improve the head output.

Further, in the present invention, since the longitudinal bias magnetic field is applied to the soft magnetic layer by means of the exchange coupling magnetic field as described above, the longitudinal bias magnetic field is not liable to be largely influenced by the external magnetic field and thus is highly stable relative to the external magnetic noise.

What is claimed is:

1. A magnetoresistance effect type head comprising a magnetoresistance effect film of a spin valve film structure, wherein said magnetoresistance effect film is a spin valve type multilayered film which comprises a non-magnetic metal layer, a ferromagnetic layer formed on one surface of the non-magnetic metal layer, a soft magnetic layer formed on the other surface of said non-magnetic metal layer, and a pinning layer which is formed on a surface of said ferromagnetic layer remote from a surface thereof abutting said non-magnetic metal layer so as to pin a direction of magnetization of said ferromagnetic layer, wherein said soft magnetic layer is set to freely change its magnetization direction in response to an external magnetic field being magnetic information, and soft magnetic bias assist layers are formed at both ends of said soft magnetic layer, respectively, wherein bias applying layers are formed on said soft magnetic bias assist layers in a junction manner, respectively, for applying a bias in a longitudinal direction of said soft magnetic layer, wherein each of said bias applying layers is made of $Ru_xM_yMn_z$ exhibiting antiferromagnetism, wherein M represents at least one selected from Rh, Pt, Pd, Au, Ag, Re, Ir and Cr, $1 \leq x \leq 30$, $1 \leq y \leq 30$, $69 \leq z \leq 90$ and $10 \leq x+y \leq 31$ wherein the unit of x, y, z is atomic %, and wherein said soft magnetic layer is applied with a bias magnetic field in the longitudinal direction of said soft magnetic layer, substantially equal to a direction from one of said bias applying layers to the other bias applying layer, by means of an exchange coupling magnetic field of said soft magnetic bias assist layers and said bias applying layers.

2. The magnetoresistance effect type head according to claim 1, wherein said pinning layer is made of PtMn or an alloy containing PtMn no less than 80 at %.

3. The magnetoresistance effect type head according to claim 1, wherein said pinning layer is made of $Pt_{x1}M'_{y1}Mn_{z1}$, wherein M' represents at least one selected from Ru, Rh, Pd, Au, Ag, Fe, Ir and Cr, $30 \leq x1 \leq 60$, $0 \leq y1 \leq 30$ and $40 \leq z1 \leq 60$ (unit of x1, y1, z1: atomic %).

4. The magnetoresistance effect type head according to claim 1, wherein assuming that a substantially operating thickness of said soft magnetic layer is set to d1, a saturation magnetization thereof is set to M1, a thickness of each of said soft magnetic bias assist layers is set to d2, and a saturation magnetization thereof is set to M2, a relation of $2d1 \cdot M1 < d2 \cdot M2 < 5d1 \cdot M1$ is satisfied.

5. The magnetoresistance effect type head according to claim 1, wherein assuming that said soft magnetic layer and said soft magnetic bias assist layers are made of substantially the same material, a substantially operating thickness of said soft magnetic layer is set to d1, and a thickness of each of said soft magnetic bias assist layers is set to d2, a relation of $2d1 < d2 < 5d1$ is satisfied.

6. The magnetoresistance effect type head according to claim 1, wherein said bias applying layers are formed with electrode portions in a junction manner, respectively.

7. The magnetoresistance effect type head according to claim 1, wherein said soft magnetic layer comprises, from the side of said non-magnetic metal layer, a first soft magnetic layer made of Co or an alloy containing Co no less than 80 weight % and a second soft magnetic layer made of $(Ni_xFe_{1-x})_yCo_{1-y}$, wherein $0.7 \leq x \leq 0.9$ and $0.5 \leq y \leq 1.0$ (unit of x, y: weight %), and wherein said non-magnetic metal layer is made of a material containing at least one selected from Au, Ag and Cu.

8. The magnetoresistance effect type head according to claim 1, wherein said bias applying layers are formed while applying an external magnetic field in the longitudinal direction of said soft magnetic layer.

9. The magnetoresistance effect type head according to claim 1, wherein said magnetoresistance effect film is formed such that said pinning layer, said ferromagnetic layer, said non-magnetic metal layer and said soft magnetic layer are stacked in turn from the side of a substrate.

10. The magnetoresistance effect type head according to claim 1, wherein materials of said bias applying layers and said pinning layer are selected so that a blocking temperature Tb1 of said bias applying layers becomes lower than a blocking temperature Tb2 of said pinning layer.

11. The magnetoresistance effect type head according to claim 10, wherein the blocking temperature Tb1 of said bias applying layers is set to $170° C. \leq Tb1 \leq 290° C.$, and the blocking temperature Tb2 of said pinning layer is set to $300° C. \leq Tb2 \leq 400° C.$ 12. The magnetoresistance effect type head according to claim 11, wherein the blocking temperature Tb1 of said bias applying layers and the blocking temperature Tb2 of said pinning layer satisfy a relation of $1.3 \leq Tb2/Tb1 \leq 2.6$.

13. A magnetoresistance effect type head comprising a magnetoresistance effect film of a spin valve film structure, wherein said magnetoresistance effect film is a spin valve type multilayered film which comprises a non-magnetic metal layer, a ferromagnetic layer formed on one surface of the non-magnetic metal layer, a soft magnetic layer formed on the other surface of said non-magnetic metal layer, and a pinning layer which is formed on a surface of said ferromagnetic layer remote from a surface thereof abutting said non-magnetic metal layer so as to pin a direction of magnetization of said ferromagnetic layer, wherein said soft magnetic layer is set to freely change its magnetization direction in response to an external magnetic field being magnetic information, and soft magnetic bias assist layers are formed at both ends of said soft magnetic layer, respectively, wherein bias applying layers are formed on said soft magnetic bias assist layers in a junction manner, respectively, for applying a bias in a longitudinal direction of said soft magnetic layer, wherein each of said bias applying layers is made of $Ru_xM_yMn_z$ exhibiting antiferromagnetism, wherein M represents at least one selected from Rh, Pt, Pd, Au, Ag, Re, Ir and Cr, $1 \leq x \leq 59$, $1 \leq y \leq 59$, $40 \leq z \leq 58$ and $42 \leq x+y \leq 60$ wherein the unit of x, y, z is atomic %, and wherein said soft magnetic layer is applied with a bias magnetic field in the longitudinal direction of said soft magnetic layer, substantially equal to a direction from one of said bias applying layers to the other bias applying layer, by means of an exchange coupling magnetic field of said soft magnetic bias assist layers and said bias applying layers.

14. The magnetoresistance effect type head according to claim 13, wherein said pinning layer is made of PtMn or an alloy containing PtMn no less than 80 at %.

15. The magnetoresistance effect type head according to claim 13, wherein said pinning layer is made of $Pt_{x1}M'_{y1}Mn_{z1}$, wherein M' represents at least one selected from Ru, Rh, Pd, Au, Ag, Fe, Ir and Cr, $30 \leq x1 \leq 60$, $0 \leq y1 \leq 30$ and $40 \leq z1 \leq 60$ (unit of x1, y1, z1: atomic %).

16. The magnetoresistance effect type head according to claim 13, wherein assuming that a substantially operating thickness of said soft magnetic layer is set to d1, a saturation magnetization thereof is set to M1, a thickness of each of said soft magnetic bias assist layers is set to d2, and a saturation magnetization thereof is set to M2, a relation of $2d1 \cdot M1 < d2 \cdot M2 < 5d1 \cdot M1$ is satisfied.

17. The magnetoresistance effect type head according to claim 13, wherein assuming that said soft magnetic layer and said soft magnetic bias assist layers are made of substantially the same material, a substantially operating thickness of said soft magnetic layer is set to d1, and a thickness of each of said soft magnetic bias assist layers is set to d2, a relation of $2d1<d2<5d1$ is satisfied.

18. The magnetoresistance effect type head according to claim 13, wherein said bias applying layers are formed with electrode portions in a junction manner, respectively.

19. The magnetoresistance effect type head according to claim 13, wherein said soft magnetic layer comprises, from the side of said non-magnetic metal layer, a first soft magnetic layer made of Co or an alloy containing Co no less than 80 weight % and a second soft magnetic layer made of $(Ni_xFe_{1-x})_yCo_{1-y}$, wherein $0.7 \leq x \leq 0.9$ and $0.5 \leq y \leq 1.0$ (unit of x, y: weight %), and wherein said non-magnetic metal layer is made of a material containing at least one selected from Au, Ag and Cu.

20. The magnetoresistance effect type head according to claim 13, wherein said bias applying layers are formed while applying an external magnetic field in the longitudinal direction of said soft magnetic layer.

21. The magnetoresistance effect type head according to claim 13, wherein said magnetoresistance effect film is formed such that said pinning layer, said ferromagnetic layer, said non-magnetic metal layer and said soft magnetic layer are stacked in turn from the side of a substrate.

22. The magnetoresistance effect type head according to claim 13, wherein materials of said bias applying layers and said pinning layer are selected so that a blocking temperature Tb1 of said bias applying layers becomes lower than a blocking temperature Tb2 of said pinning layer.

23. The magnetoresistance effect type head according to claim 22, wherein the blocking temperature Tb1 of said bias applying layers is set to $170°\ C. \leq Tb1 \leq 290°\ C.$, and the blocking temperature Tb2 of said pinning layer is set to $300°\ C. \leq Tb2 \leq 400°\ C.$ 24. The magnetoresistance effect type head according to claim 23, wherein the blocking temperature Tb1 of said bias applying layers and the blocking temperature Tb2 of said pinning layer satisfy a relation of $1.3 \leq Tb2/Tb1 \leq 2.6$.

* * * * *